United States Patent [19]

Kimura et al.

[11] Patent Number: 5,424,555
[45] Date of Patent: Jun. 13, 1995

[54] PHOTO FILM ANALYZER, AND METHOD AND SYSTEM FOR INSPECTING PHOTO FILM

[75] Inventors: Tsutomu Kimura; Shigeru Tanaka; Junji Sugano, all of Kanagawa, Japan

[73] Assignee: Fuji Photo Film Co., Ltd., Kanagawa, Japan

[21] Appl. No.: 251,119

[22] Filed: May 31, 1994

[30] Foreign Application Priority Data

May 31, 1993 [JP] Japan .................................. 5-129610

[51] Int. Cl.[6] ........................................... G01N 21/86
[52] U.S. Cl. ......................................... 250/559; 355/41
[58] Field of Search ................ 355/40, 41; 354/298; 250/559, 571; 356/443, 444

[56] References Cited

U.S. PATENT DOCUMENTS 4,641,019  2/1987  Inatsuki ................................. 250/571

Primary Examiner—David C. Nelms
Assistant Examiner—Jacqueline M. Steady
Attorney, Agent, or Firm—Sughrue, Mion, Zinn, Macpeak & Seas

[57] ABSTRACT

A scanner as a film analyzer, which inspects a frame on photo film, is consecutively supplied with the film by a notcher, which forms a notch in the film. The scanner includes an image area sensor which subjects the frame on the film to photometry. A pair of feeding rollers feed the film, so the film passes the photometric station. A winding shaft winds the film fed from the photometric station. A dancer roller displaces one portion of the film from a feeding path to form a loop. A set of loop checking sensors is disposed with the dancer roller, and checks displacement of the film in comparison with a predetermined upper limit. The notcher is disabled if the film displacement is greater than the upper limit. The displacement of the film is checked in comparison with a predetermined lower limit. The image area sensor is disabled if the film displacement is smaller than the lower limit.

19 Claims, 11 Drawing Sheets

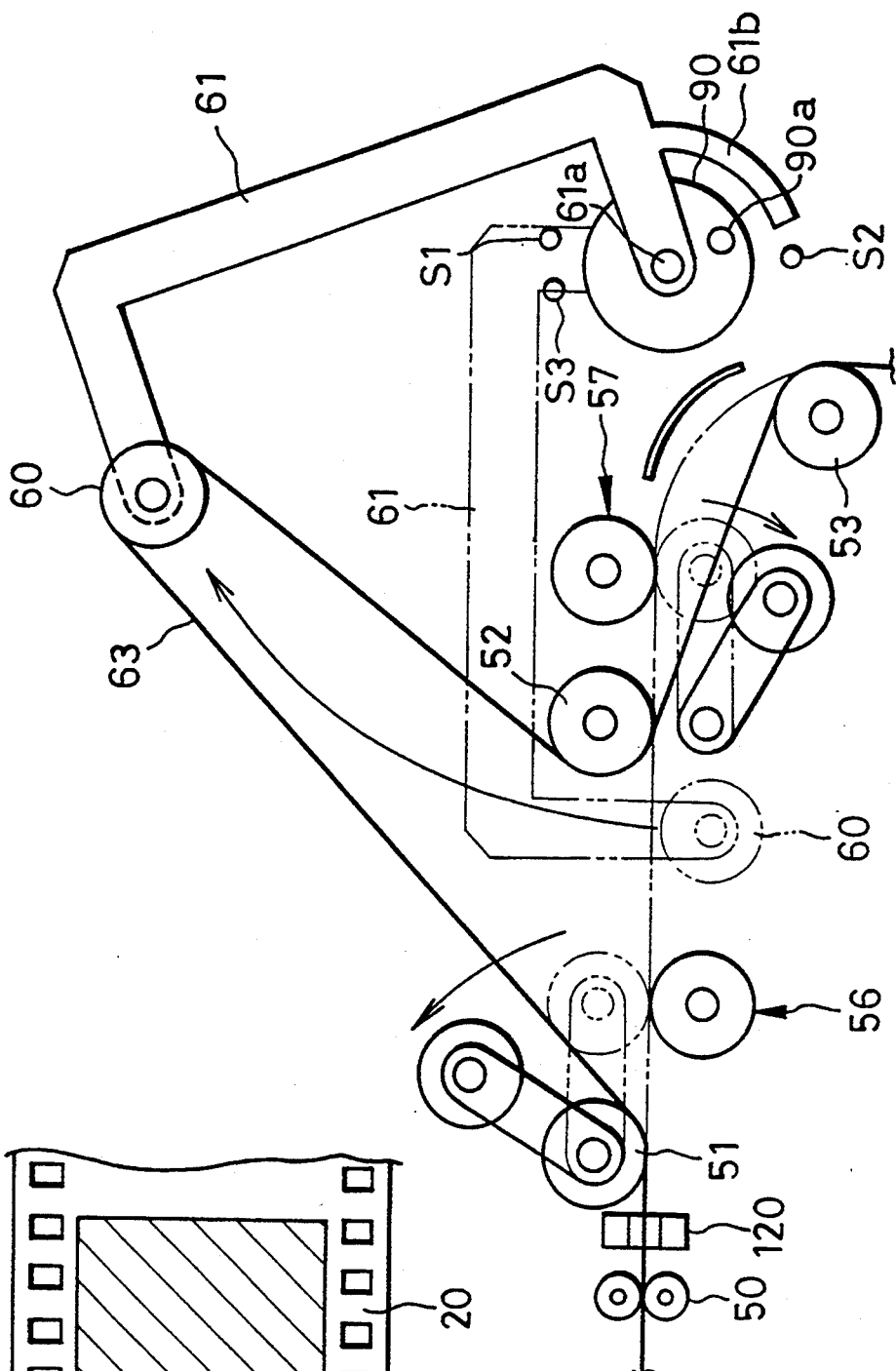
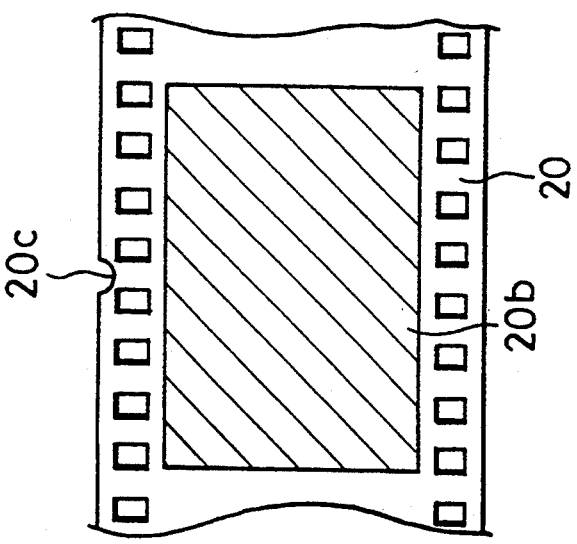

PHOTO FILM ANALYZER, AND METHOD AND SYSTEM FOR INSPECTING PHOTO FILM

BACKGROUND OF THE INVENTION

1. Field of the Invention

The present invention relates to a photo film analyzer for determining a printing condition of an image, and a method and system for inspecting photo film. More particularly, the present invention relates to a photo film analyzer which can be coupled to a notcher and used for treating photo film of which extra printing is to be performed, and a method and system for inspecting the photo film.

2. Description of the Related Art

In a photo laboratory, photo film is developed and used for producing photographic prints. In a large-scale photo laboratory, a great number of strips of exposed photo film are spliced into a single film of great length. The elongated film is wound in a roll for the purpose of efficiency in printing. The film of the roll is developed in a film processor, and then supplied into a notcher/puncher to be inspected. According to the inspection result, an auto-printer is used for exposing the photographic paper to obtain prints.

The film inspection at the notcher/puncher requires a skilled operator to observe visually a negative image to determine an exposure correcting amount on the basis of personal experience. Recently it is known to accomplish such inspection through use of a scanner. In such a case, film is inserted in a notcher/puncher or an auto-notcher, in which frames on the photo film which are designated for printing are automatically provided with notches of a semi-circular shape. Each frame with a notch is inspected in the scanner to calculate the exposure correcting amount.

It is conceivable to connect the scanner to the notcher/puncher as installed. The film could be notched in the notcher/puncher automatically. The film could then be sent to the scanner from the notcher/puncher while unwound. An exposure correcting amount could thus be determined automatically in the scanner. However, when film designated for extra printing is handled, the scanner, which is fixedly connected to the notcher/puncher, is not required.

Also, the capability of a scanner must be adapted to that of a notcher/puncher before the scanner could be connected to the notcher/puncher. Conventional scanners are not adopted to be connectable to notcher/punchers.

SUMMARY OF THE INVENTION

In view of the foregoing, an object of the present invention is to provide a film analyzer which can be coupled to notcher/punchers of various models.

Another object of the present invention is to provide a film analyzer which is easy to use when performing extra printing from photo film.

In order to achieve the above and other objects and advantages of this invention, a photometric device subjects the frame on the film to photometry. A feeding device feeds the film, to cause the film to pass through the photometric device. A winding device winds the film fed from the photometric device. A displacing device is disposed remote from a path of feeding the film, and displaces one portion of the film from the feeding path. A loop is formed from the one portion of the film. A checking device is disposed in association with the displacing device and checks displacement of the film, and has a position representing a predetermined upper limit of the film displacement relative to the feeding path. The checking device generates a signal representing whether or not the film displacement is equal to or smaller than the upper limit. A controller is connected to the checking device and stops the notcher from supplying the film if the film displacement is greater than the upper limit.

The checking device further has a position representing a predetermined lower limit of the film displacement relative to the feeding path, and generates a signal representing whether or not the film displacement is equal to or greater than the lower limit. The controller stops the photometry of the photometric device if the film displacement is smaller than the lower limit.

Therefore, the film analyzer according to the present invention can be operatively coupled to notcher/punchers of various models. The film analyzer is thus easy to use when performing extra printing from photo film.

It is conceivable conventionally to construct a scanner connectable to the notcher/puncher in a disconnectable manner. However, an additional operation for moving the scanner is required for connection and/or disconnection. This increases labor in a photo laboratory.

In the present invention, it is possible to perform the extra printing without disconnecting the film analyzer from the notcher/puncher. No additional operation for moving the film analyzer is required for disconnection and thus labor is minimized.

BRIEF DESCRIPTION OF THE DRAWINGS

The above objects and advantages of the present invention will become more apparent from the following detailed description when read in connection with the accompanying drawings, in which:

FIG. 1A is a plan view illustrating photo film provided with a notch at a frame;

FIGS. 6 and 6A illustrate the loop checking sensors and a relationship between them and the control of a notcher/puncher and the scanner;

DETAILED DESCRIPTION OF THE PREFERRED EMBODIMENT OF THE PRESENT INVENTION

Figure 1:
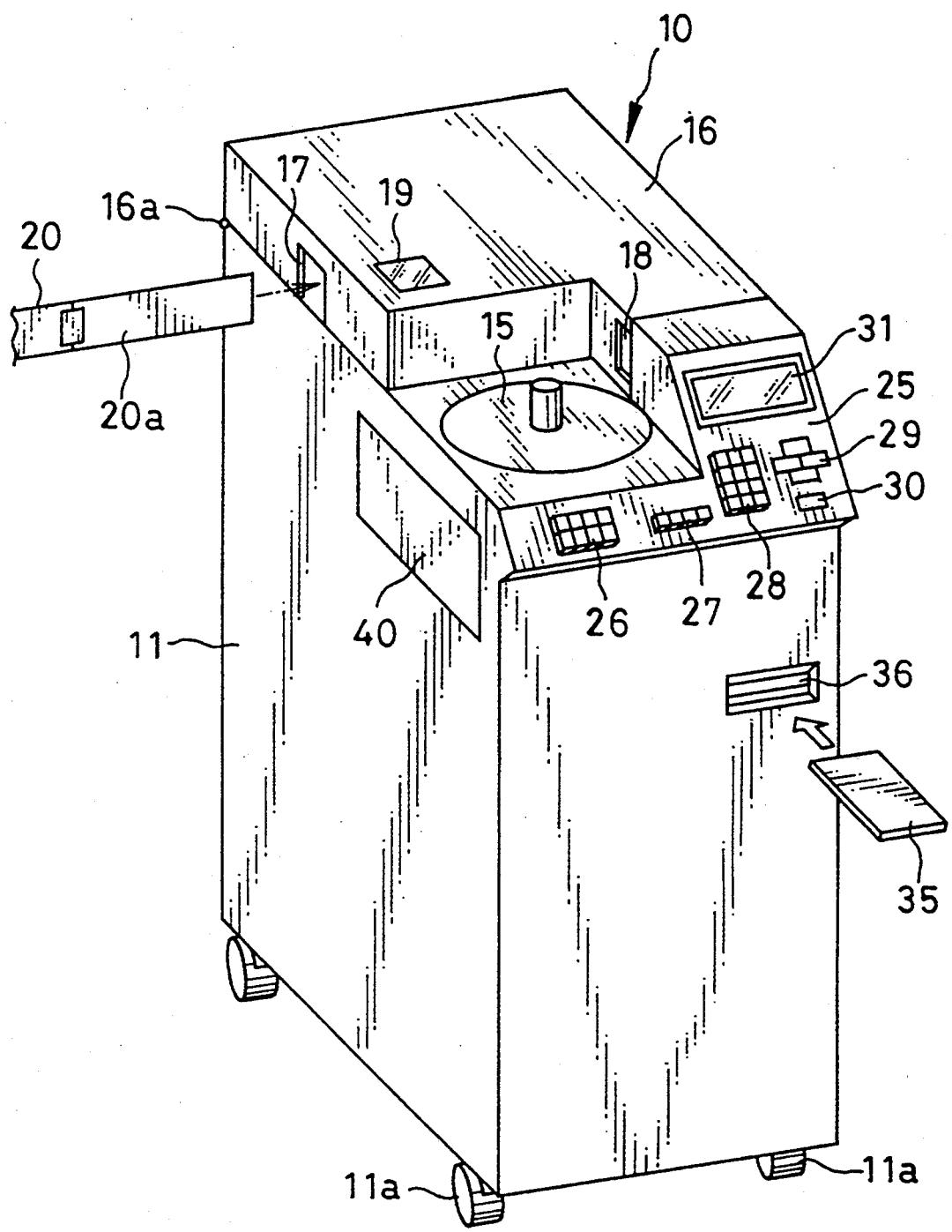
FIG. 1 is a perspective view illustrating a scanner of the preferred embodiment of the present invention.

FIG. 1 illustrates a scanner 10 according to the preferred embodiment of the present invention. The scanner 10 has an upright rectangular scanner body 11, in which a film feeding path 12 is formed, and a light source 13 and a photometric device 14 are assembled (see FIG. 2). A bottom of the scanner body 11 is provided with casters 11a, which enables an operator of the scanner 10 to easily transport it for installation.

Figure 2:
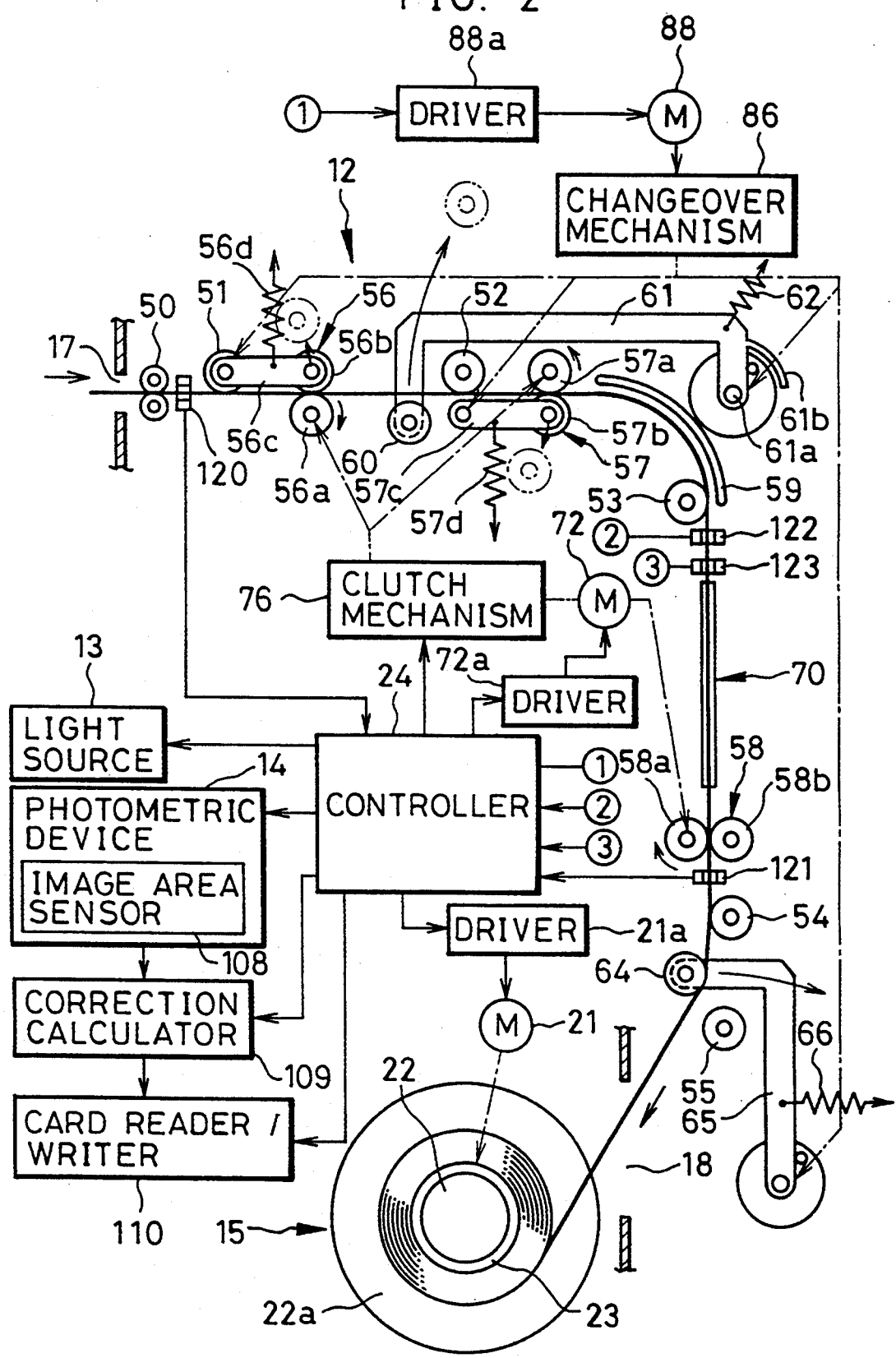
FIG. 2 is an explanatory view in vertical section, illustrating the scanner of FIG. 1 in an auto-advancing state.

As shown in FIG. 2, the feeding path 12 is formed in the top of the scanner body 11 and is covered by a top cover 16, except for a film winding section 15 (see FIG. 1). The top cover 16 is provided with a film entrance 17 and a film exit 18. In the top cover 16 is formed an observing window 19, in which a picture frame 20b illustrated in FIG. 1A is observable in a fixed position. The top cover 16 is secured on the top via hinges 16a in an openable manner. When the scanner 10 malfunctions, such as during jamming photo film 20, or when the feeding path 12 requires cleansing or inspecting, the top cover 16 is opened upward. A front end of the photo film 20 is attached to a leader sheet 20a.

The film winding section 15, as illustrated in FIG. 2, is constituted of a winding motor 21 and a winding shaft 22 rotated by the winding motor 21. The winding shaft 22 has a reel receiving disk 22a. A winding reel 23 is fitted on the disk 22a, and is fixedly set on the winding shaft 22. The winding motor 21 is controlled by a controller 24 via a driver 21a.

In FIG. 1, a front portion of the top of the scanner body 11 slopes down obliquely to define an inclined face 25, where various operable keys 26 to 30 and a liquid crystal display panel 31 are disposed. A front of the scanner body 11 is provided with an inserting slot 36 for an LSI (Large Scale Integration) card 35. A left face of the scanner body 11 is provided with a reprinting reel holder 40 disposed to be lower than the film winding section 15. The reprinting reel holder 40, as described later in detail, is used for printing extra frames from photo films after the films have been returned to the customer.

Figure 3:
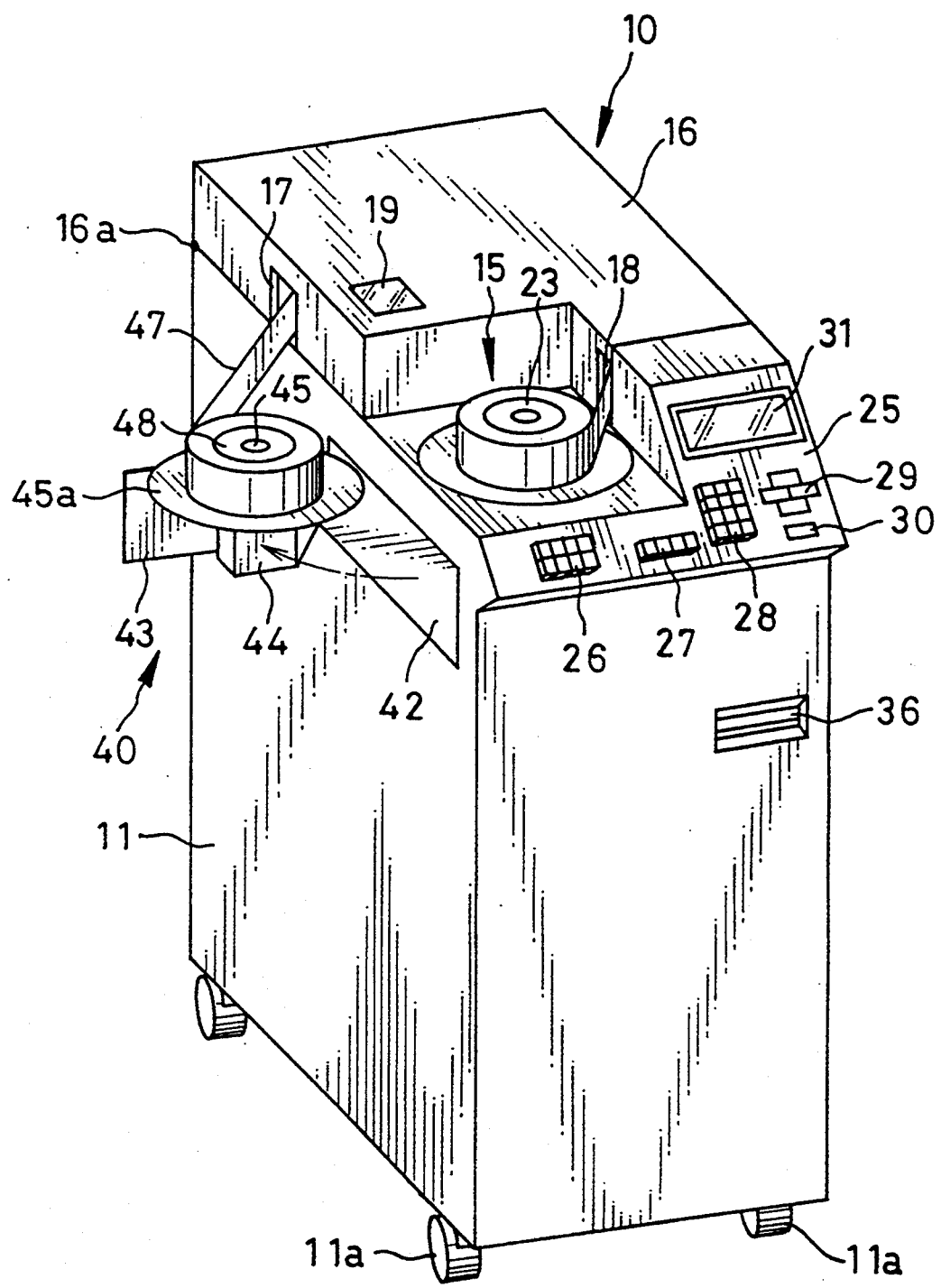
FIG. 3 is a perspective view illustrating the scanner in which a reprinting reel holder is used.
Figure 7:
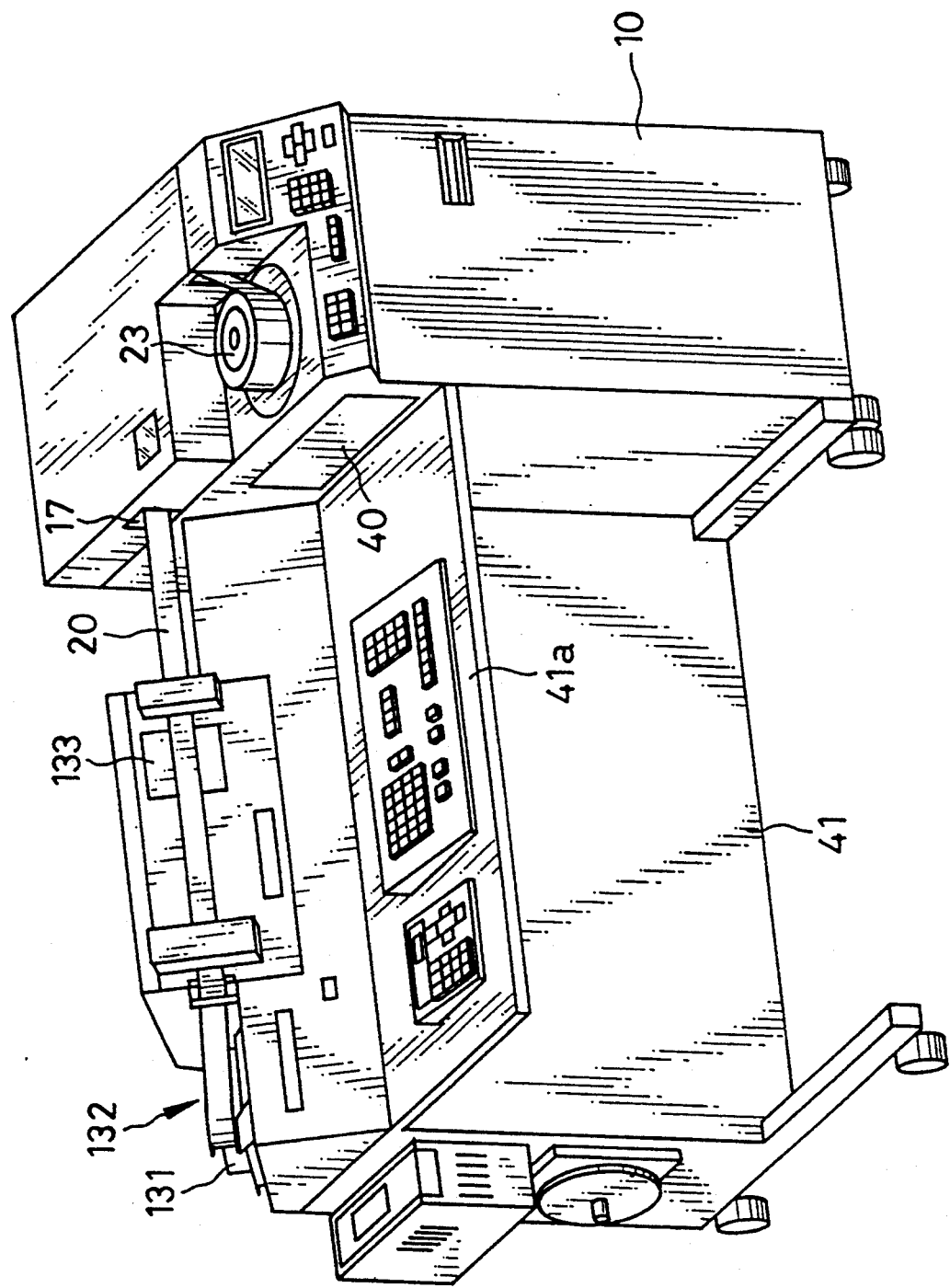
FIG. 7 is a perspective view illustrating the notcher/puncher combined with and connected to the scanner.

As illustrated in FIG. 3, the reprinting reel holder 40 is mounted, and containable, in a container recess 42 formed in the left face of the scanner body 11, and can be displaced between a contained position and a position in which it is drawn out of the container recess 42 in a rotatable fashion. The reprinting reel holder 40 is mounted in a position to be placed over a table 41a of a notcher/puncher 41, as illustrated in FIG. 7, when it is out of the container recess 42. Even while the scanner 10 is connected to the notcher/puncher 41, a reel with the photo film wound for reprinting can be easily mounted on the reprinting reel holder 40.

The reprinting reel holder 40 is constituted of a reel fitting support 44, which is pivotally mounted on the scanner body 11, a reel shaft 45 and a lifting mechanism (not shown). On the reel shaft 45 is fitted a supply reel 48 for reprinting, around which spliced photo films connected with splice tapes are wound to be reprinted. When the reprinting reel holder 40 is pivoted out of the scanner body 11, the lifting mechanism responsively raises a reel receiving disk 45a to be flush with the feeding path 12. This functionality can be accomplished with a known mechanical linkage, or the like.

A pulse motor (not shown) is connected to the reel shaft 45. When the film 47 is unwound from the supply reel 48, the reel shaft 45 is braked. The braking force is adjustable by providing the pulse motor with electric current. When the braking force is controlled, the amount of feeding of the photo film can be adjusted. To rewind the film 47 around the supply reel 48 after a photometric operation, a rear end of the film 47 can be directly set on the emptied supply reel 48 without being passed through the feeding path 12.

In FIG. 2, the feeding path 12 is formed in an L-shape as viewed downwardly from the top. The film 20 is inserted in the film entrance 17 through the left face of the scanner body 11, and fed toward and exited through the film exit 18 in the middle of the body top. The feeding path 12 is constituted of a pair of freely rotatable guide rollers 50, free guide rollers 51 to 55, two pairs of forcibly driven advancing rollers 56 and 57 for auto-advancement, a pair of film feeding rollers 58, and a film guide plate 59. Those elements are mounted on a framework (not shown) of the scanner 10 by vertical mounting rods. Therefore, the film 20 is fed while in an erect position.

Figure 6:
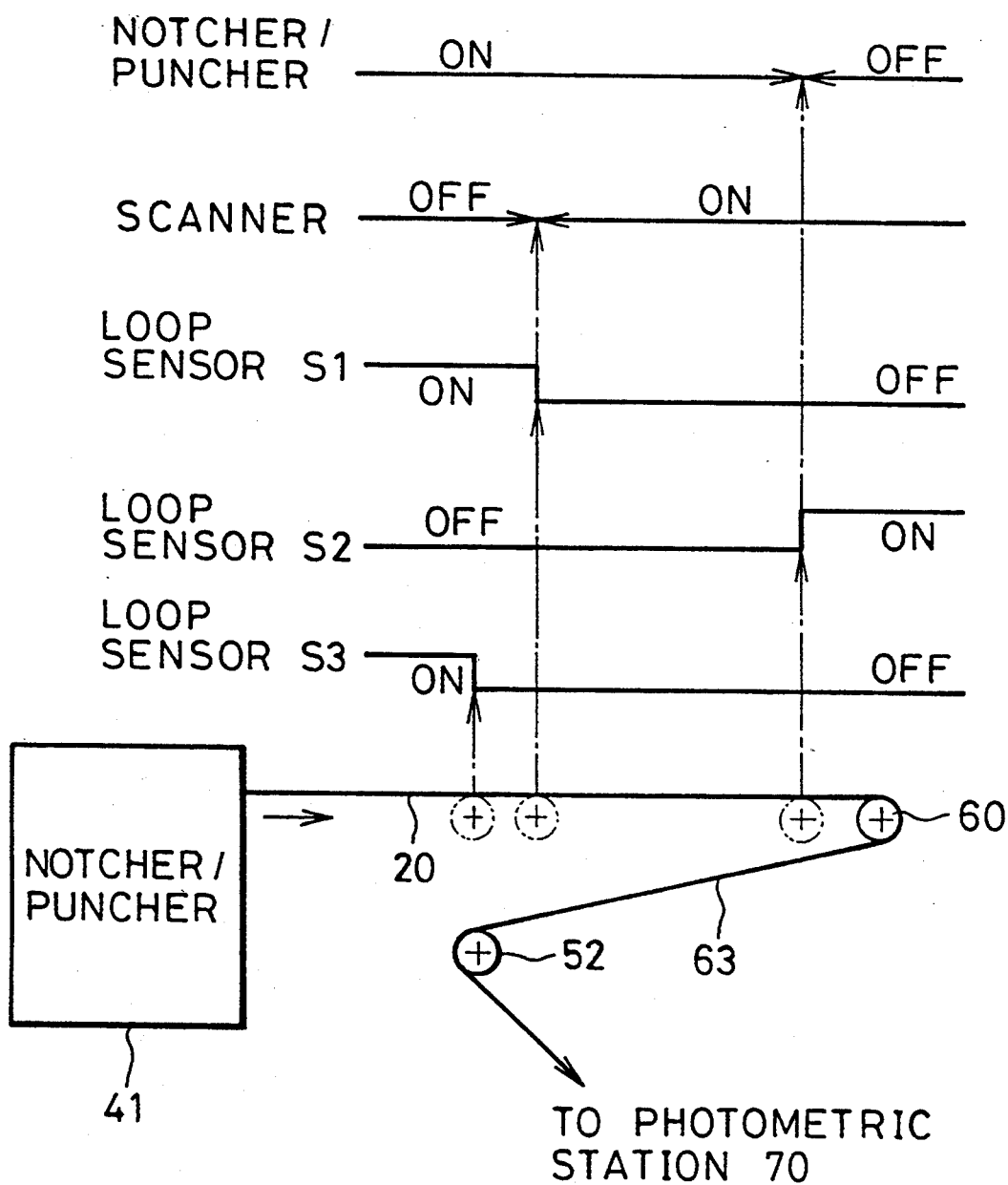

In the feeding path 12, an upstream dancer roller 60 is rotatably mounted on an arm 61 between the guide roller 52 and the advancing rollers 56. The arm 61 is biased by a shifting spring 62 clockwise as viewed in the drawing. If the speed of feeding the film 20 downstream from the dancer roller 60 is lower than that upstream from the dancer roller 60, then the arm 61 is swung about a rotational shaft 61a as in FIG. 4, to form a dancer loop 63 for absorbing the difference in feeding speed of the film 20 in the feeding path 12. In FIG. 6, the dancer loop 63 absorbs the difference in processing speed between a photometric station 70 and the notcher/puncher 41.

Figure 4:
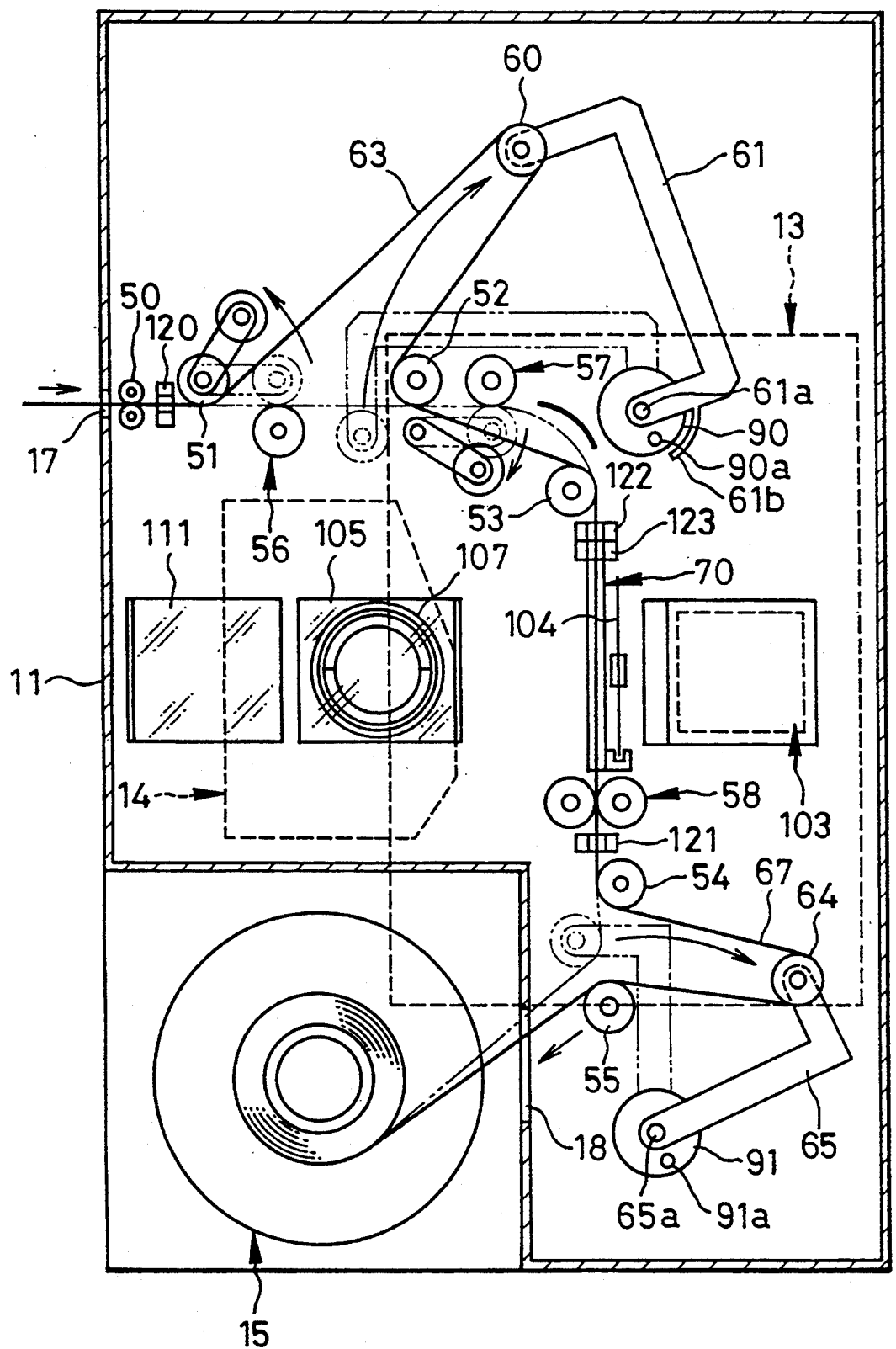
FIG. 4 illustrates, in vertical section, a looping state of the scanner.

In FIGS. 2 and 4, the feeding path 12 has a downstream dancer roller 64 rotatably mounted on an arm 65 and between the guide rollers 54 and 55. The arm 65 is biased by a shifting spring 66 clockwise. If the film feeding speed downstream from the dancer roller 64 is lower than that upstream from the dancer roller 64, then the arm 65 is swung about a shaft 65a, as in FIG. 4, to form a dancer loop 67 for absorbing the difference in feeding speed of the film 20 in the feeding path 12. The dancer loop 67 absorbs the difference in processing speed between the photometric station 70 and the winding section 15.

The dancer rollers 60 and 64 are mounted via shafts on respective free ends of the arms 61 and 65 vertically. Each of the rotational shafts has a bottom end fixed on the arm 61 or 65, and a top end which is separate from the arm. It follows the film 20 can be easily removed from, or reset on, the dancer rollers 60 and 64 and the other rollers by raising or inserting the film.

In FIG. 2, the pairs of the advancing rollers 56 and 57 and the pair of the feeding rollers 58 are respectively constituted of a driving roller 56a, 57a, and 58a and a driven roller 56b, 57b, and 58b in contact with the corresponding driving roller. Those driving rollers 56a, 57a, and 58a are rotated by a film feeding motor 72. The film feeding motor 72 is controlled via a driver 72a by a controller 24. In the auto-advancement of the film 20, the two pairs 56 and 57 of the advancing rollers are driven to feed the film 20. After the auto-advancement, the film 20 is moved frame by frame, by driving the pair of the feeding rollers 58, for the purpose of positioning each frame 20b on the photometric station 70. As in FIG. 5, the pair of the feeding rollers 58 are connected to the film feeding motor 72 via a timing belt 71 constantly without disconnection, because the roller 58a has a coaxial gear portion in mesh with the belt 71. The roller 56a has a coaxial gear portion in mesh with the belt 73. The driving rollers 56a and 57a are connected to a clutch mechanism 76 via a timing belt 73 and gears 74 and 75. When in the auto-advancement mode, the clutch mechanism 76 transmits the movement of the timing belt 71 to the timing belt 73. The two pairs 56 and 57 of the advancing rollers are rotated in the auto-advancement.

The clutch mechanism 76 consists of a planetary gear train 80, a clutch arm 81, and a clutch lever 82. The planetary gear train 80 is constituted of a driving gear 80a, a planet gear 80b, and a sun gear 80c. The driving gear 80a is fixed on, and coaxial with, the driving roller 58a. The sun gear 80c is fixed on, and coaxial with, a belt pulley 83 of the timing belt 71. The planet gear 80b is rotatable on the clutch arm 81, meshed with the sun gear 80c, and rotates while revolving about the sun gear 80c.

The clutch lever 82 is mounted rotatably on the framework (not shown) via a rotational shaft 82a, and has two distal ends, one of which is engaged with the clutch arm 81, and the other of which is engaged with the dancer roller 64. The clutch lever 82 is biased by a coil spring 84 counterclockwise, as viewed in the drawing. The clutch arm 81 is biased in a counterclockwise direction by a coil spring 85. The coil spring 85 has a biasing force which is greater than that of the coil spring 84, so that the planet gear 80b tends to be separated from the driving gear 80a. In the auto-advancement mode, the dancer roller 64 is set in the auto-advancing position. The clutch lever 82 is rotated clockwise as in FIG. 5. The clutch arm 81 is rotated counterclockwise by the coil spring 85 to bring the planet gear 80b into mesh with the driving gear 80a. The pairs 56 and 57 of the advancing rollers are rotated in the auto-advancement mode, to advance the front end of the leader sheet 20a on the film 20 automatically.

Each of the driven rollers 56b and 57b among the advancing rollers 56 and 57 is connected to the driving rollers 56a, 57a via arms 56c and 57c and in fashion movable between contacted and separated states. Swinging operation of the arms 56c and 57c and the dancer arms 61 and 65 are controlled by a changeover mechanism 86 for setting in the auto-advancing position.

The changeover mechanism 86 is associated with a changeover motor 88, and drives the arms 56c and 57c and the dancer arms 61 and 65, so as to displace the pairs 56 and 57 of the advancing rollers and the dancer rollers 60 and 64 between the auto-advancing position of FIG. 1 and the looping position of FIG. 4. The changeover mechanism 86 incorporates a linking device, which converts rotational movement of the changeover motor 88 into swinging movement of those arms 56c, 57c, 61 and 65. The changeover motor 88 is controlled by the controller 24 via a driver 88a.

In the auto-advancing position, the driven rollers 56b and 57b contact the driving rollers 56a and 57a. The film 20 is nipped and conveyed by the pairs 56 to 58 of the advancing and feeding rollers. After an auto-advancement operation, the changeover mechanism 86 becomes inactive so that the arms 56c, 57c, 61 and 65 are allowed to move, as they are not held forcibly by the changeover mechanism 86. Responsively, springs 56d and 57d and the shifting springs 62 and 66 move the associated arms 56c, 57c, 61 and 65 toward the looping position, where the advancing rollers 56 and 57 are released from being nipped. Then the film 20 is conveyed only by the feeding rollers 58. The dancer arms 61 and 65 stand biased toward the looping position by the shifting springs 62 and 66. When the feeding speed in a downstream station regarding the dancer rollers 60 and/or 64 is lower than that in an upstream station, dancer loops 63 and/or 67 in FIG. 4 are formed.

Figure 5:
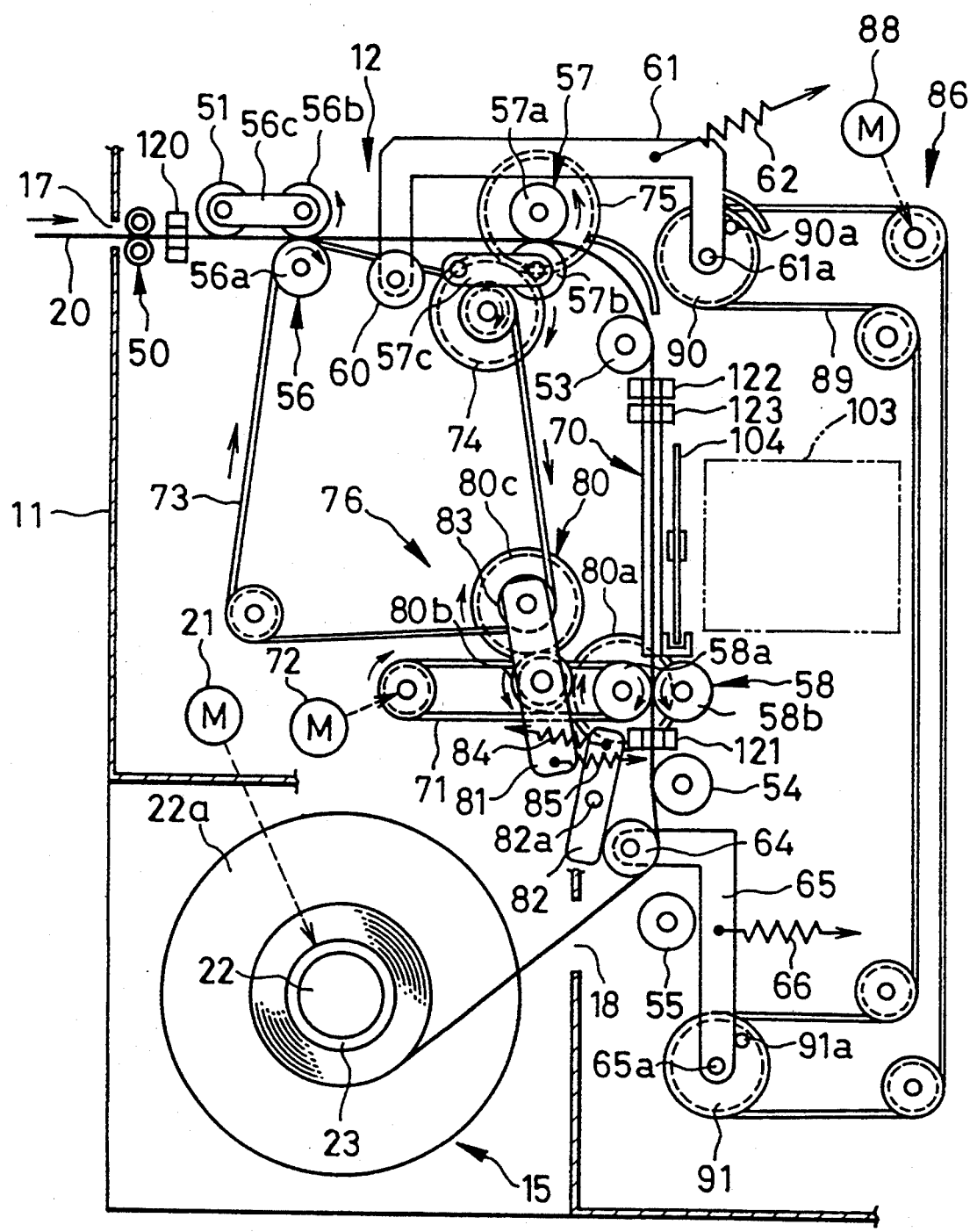
FIG. 5 illustrates, in vertical section, a clutch mechanism and a changeover mechanism of the scanner.

As illustrated in FIG. 5, the changeover mechanism 86 has timing pulleys 90 and 91 and a timing belt 89 driven by the changeover motor 88. The timing pulleys 90 and 91 are respectively supported on the rotational shafts 61a and 65a where the two dancer arms 61 and 65 are supported. The timing pulleys 90 and 91 are rotated by the timing belt 89. Pushing pins 90a and 91a are projected from the pulleys 90 and 91 in eccentric positions, and displaceable between the auto-advancing position of FIG. 5 and the looping position of FIG. 4. In FIG. 5, the pins 90a and 91a push the arms 61 and 65 to assume the auto-advancing position. In FIG. 4, the pins 90a and 91a are retracted from the arms 61 and 65 and prevented from pushing the arms 61 and 65.

After the auto-advancement operation, the changeover motor 88 rotates forward to drive the pulleys 90 and 91 clockwise. The pulleys 90 and 91 are set in the looping position, where the pins 90a and 91a are displaced into the retracted positions to allow the dancer arms 61 and 65 to move for the operation of forming the loops 63 and 67.

When in the looping position, the changeover mechanism 86 moves away the driving rollers 56b and 57b from the driving rollers 56a and 57a among the advancing rollers 56 and 57. The film 20 is thus conveyed only by the feeding rollers 58. As the film 20 is released from being nipped between the advancing rollers 56 and 57, resistance to the feeding the film 20 is lowered.

In FIG. 4, the photometric station 70 is located before the pair of the feeding rollers 58. As illustrated in FIG. 5, there are disposed a light source 13 and the photometric device 14 between which the photometric station 70 is disposed. The light source 13 is constituted of a lamp (not shown), a light adjusting filter (not shown) for adjusting a light quality of the lamp, and a diffusing box 103 defining an L-shaped light path. There is disposed a mask turret 104 between the diffusing box 103 and the film 20 in the photometric station 70. The mask turret 104 includes a plurality of photometric openings having sizes of a full size frame, a half size frame, a panoramic frame, and an HDTV size frame, respectively. In response to frame size information supplied into the scanner 10, one of the photometric openings is selected automatically. Note that the frame size information is supplied from the notcher/puncher. Alternatively, the scanner 10 itself may be constructed to have a sensor for detecting the frame size automatically. Further, the film may have a magnetic recording layer, on which the frame size information may be stored and read out for use in the scanner.

The light passed through the designated frame 20b, as illuminated by the light source 13, is reflected by a half mirror 105, passed through a zoom lens 107, and sent to an image area sensor 108 (see FIG. 2). Each of the points within the designated frame 20b is subjected to three-color separating photometry in the image area sensor 108. A correcting data calculator 109 calculates correcting data in accordance with the photometric value and in a form of an exposure correcting amount relative to the large-area transmittance density (LATD). In the calculation of the correcting data, the designated frame 20b is analyzed statistically according to the photometric values of the measured points, and is classified as one scene among various different types. Exposure correcting data is determined according to the particular type of the scene in a known manner. An LSI card reader/writer 110 writes the correcting data into the LSI card 35 in correspondence with frame location data.

The light passed through the half mirror 105 is reflected on the mirror 111, so that the frame 20b designated from photometry is observable through the observing window 19 to an operator. It is possible to check and adjust the stop position of the designated frame 20b without opening the top cover 16. Ambient light may enter through the observing window 19, but is reflected by the mirror 111, is reflected upward by the half mirror 105, or passed through the half mirror 105 to come toward the light source. It follows that no ambient light falls on the image area sensor 108. Accordingly, ambient light does not affect the photometry measurements.

As illustrated in FIG. 2, the feeding path 12 has film sensors 120 and 121 for detecting the front end of the leader sheet 20a on the film 20, a splice sensor 122 for detecting spliced portions of the film 20, and a notch sensor 123 for detecting notches 20c (see FIG. 1A) in the film 20. Signals from those sensors are sent to the controller 24.

The upstream film sensor 120 is disposed downstream from the guide rollers 50, and detects the beginning of insertion of the front end of the leader sheet 20a on the film 20 into the scanner 10. In response to this detection, the auto-advancement operation is started.

The downstream film sensor 121 is disposed downstream from the feeding rollers 58, and detects passage of the front end of the leader sheet 20a on the film 20 between the film feeding rollers 58.

The splice sensor 122 and the notch sensor 123 are disposed upstream from the photometric station 70. The splice sensor 122 detects splicing tapes based on their difference in density as compared to the support of the film 20. The controller 24, in accordance with the output of the splice sensor 122, designates the location of the designated frames 20b for each strip of the film prior to the splicing.

The notch sensor 123 is constituted of a beam projector and a beam receiver, and detects a notch position by comparing amounts of transmitted light between interception of the beam path of the sensor 123 at a film portion and a full transmission of the beam of the sensor 123 at each notch 20c. The controller 24 responds to the notch detecting signal, rotates the feeding rollers 58 at a predetermined amount, and positions the designated frame 20b in correspondence with the detected notch 20c on the photometric station 70.

The controller 24 is constituted of a microcomputer, which is well known in the art, programmed in a desired manner and controls each relevant section according to detecting signals from the sensors 120 and 123, which are conventional devices.

FIG. 6 illustrates positions of the dancer roller 60, actuation of three loop checking photo sensors S1 to S3, and control of operation of the notcher/puncher 41 and the scanner 10. To detect a displaced angle of the first dancer arm 61, the loop checking sensors S1 to S3 are arranged around the rotational shaft 61a, as illustrated in FIG. 6A, and adapted to detection of a looped amount of the dancer loop 63 in cooperation with a blade 61b. The controller 24 executes control of photometry and actuation of the notcher/puncher in accordance with the looped amount.

The loop checking sensor S1 is used for control of actuation of the scanner 10. If the sensor S1 is turned off, then the film 20 is fed for the photometric operation. If the sensor S1 is turned on, then the film 20 is stopped from being fed. The loop checking sensor S2 is used for control of actuation of the notcher/puncher 41. If the sensor S2 is turned off, then the notcher/puncher 41 is allowed to continue operation. If the sensor S1 is turned on, then the scanner 10 sends a busy signal into the notcher/puncher 41 for the purpose of stopping the notcher/puncher 41 from feeding the film 20. The loop checking sensor S3 is used as a switch for detection of the auto-advancing position. When the scanner 110 is in the auto-advancing position, the film 20 is fed to form a loop even when the loop checking sensor S1 is turned on.

Fourth and fifth loop checking sensors (not shown) are disposed and associated with the second dancer arm 65 for detection of its displaced angle in a similar manner. According to those sensors, rotation of the reel 23 in the film winding section 15 (see FIG. 4) is controlled. If the looped amount comes greater than a predetermined value, the excess is detected by the fourth loop checking sensor. Responsively, the film winding motor 21 (see FIG. 2) is rotated to wind the film 20 about the reel 23. When the looped amount decreases to a predetermined extent, the fifth loop checking sensor detects the same and the film winding motor 21 is stopped.

Figure 8:
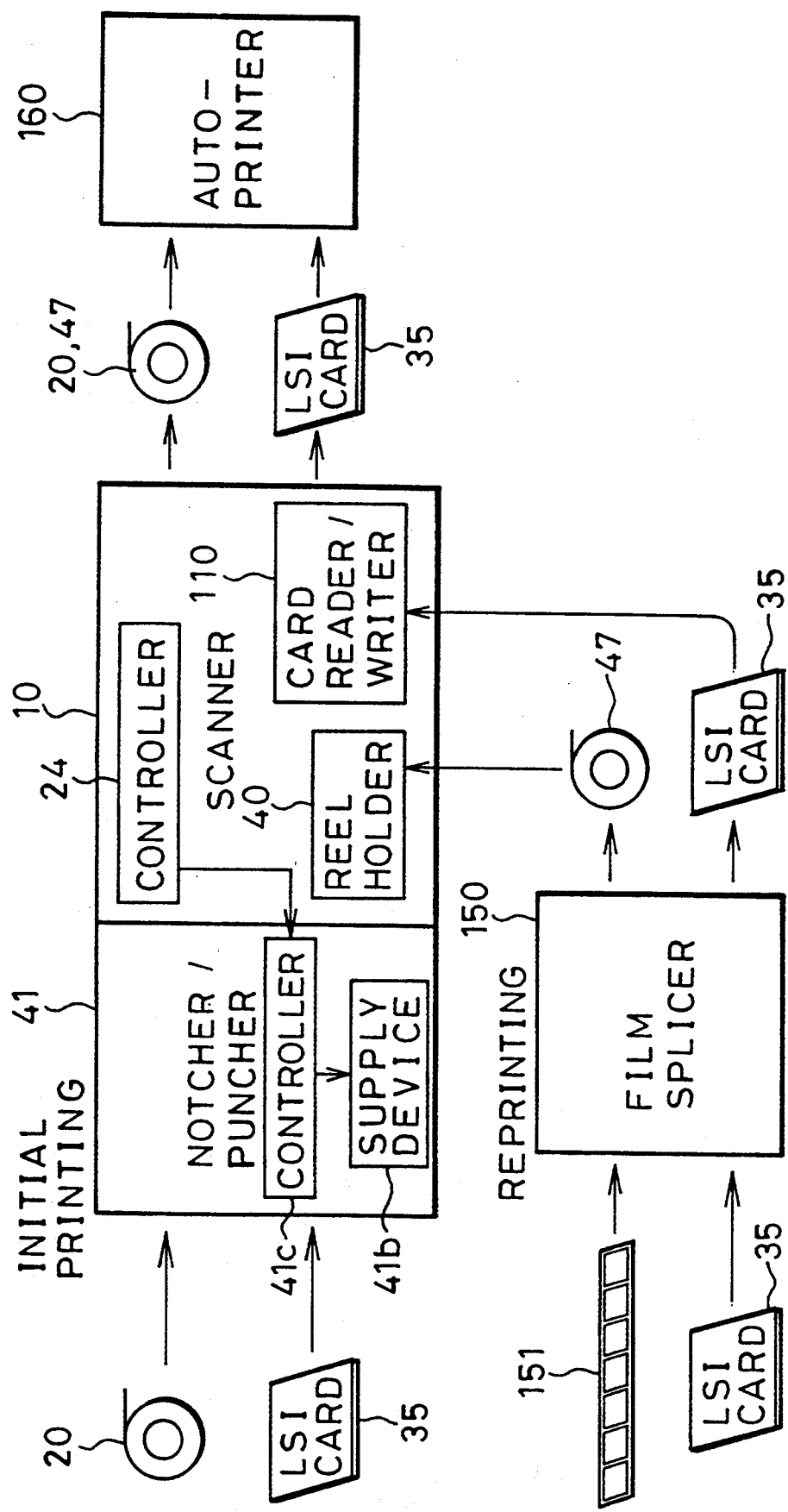
FIG. 8 is an explanatory view illustrating operation of the scanner for both initial printing steps and reprinting steps.

FIGS. 7 and 8 illustrate the scanner 10 when connected to the notcher/puncher 41. The entrance side of the scanner 10 is connected to an exit side of the notcher/puncher 41. The scanner 10 is electrically connected to a controller 41c of the notcher/puncher 41 via a connecting cable. The notcher/puncher 41 enters data into the controller 24 of the scanner 10, such as frame location data and inspecting data. When the looped amount at the first dancer roller 60 is decreased, the scanner 10 in turn sends a busy signal into the notcher/puncher 41 for commanding the stop of a supply device 41b of the notcher/puncher 41.

A roll 131 is formed by winding the photo film developed in a film processor (not shown). The film roll 131 is mounted into a reel holder 132 in the notcher/puncher 41, which automatically detects the locations of the frames 20b according to difference in density between the film support and the frame 20b. The frame 20b as detected is positioned at a back light section 133. An operator observes each frame 20b stopped in the back light section 133, and checks whether it is printable, or suitable for being treated in the scanner 10 for exposure correction. The operator operates the keys to input the result of the checking. The printable frame 20b is provided with the notch 20c. If the frame 20b is unsuitable to be treated in the scanner 10, such as a fogged frame, or a frame created by use of peculiar illumination in photography, then the operator manually determines inspection-corrected data, and inputs manually the same into the scanner 10. The unsuitable frame is subjected in the scanner 10 to automatic correction of exposure, and then also subjected to additional correction in consideration of the manually entered inspection-corrected data.

FIG. 8 illustrates a flow of the initial printing and the flow of the reprinting for extra printing. In the initial printing, the photo film 20 developed by a film processor is set in the notcher/puncher 41. The LSI card 35 is set at the card reader/writer 110 in the scanner 10. The frames 20b on the film 20 to be printed are each provided with a notch 20c, are set in the photometric station 70 in the scanner 10, and subjected to three-color separating photometry in the image area sensor 108 for all points within each frame 20b. Photometric values are obtained, and used in calculation of exposure correcting data in a form of a correcting amount relative to the LATD (Large Area Transmission Density) in a known manner. The exposure correcting data is written into the LSI card 35 together with the frame location data. After the photometric operation, the film 20 and the LSI card 35 are set in an automatic printer 160, in which the designated frame 20b having the notch 20c is placed in a printing station, and is subjected to measurement of LATD. An exposure amount is calculated in accordance with the LATD and the exposure correcting data obtained in the scanner 10. In accordance with the exposure amount, the image of the designated frame 20b is printed on a color photo paper through photographic exposure.

For reprinting, a known film splicer 150 is used for connecting a number of film pieces 151 to obtain an elongated film, which is wound about the supply reel 48 as a film roll. At the same time as the connection, the operator enters designated locations of frames 20b requiring reprinting and the number of prints to be produced. This data is written into the LSI card 35. The roll of the film 47 to be reprinting and the LSI card 35 are then set into the scanner 10.

As illustrated in FIG. 3, the reprinting reel holder 40 is drawn out of the scanner body 11. Responsively, the disk 45a is lifted to the level of the feeding path 12, and is maintained in such a position. The supply reel 48 with the film 47 wound thereabout is fitted on the reel shaft 45. Subsequently, the front end of a leader sheet on the film 47 is inserted into the film entrance 17. As is similar to the initial printing operation, the auto-advancement operation is started. The front end of the leader sheet on the film 47 is thus advanced through the film exit 18. An operator manually picks up the front end of the leader sheet at the film exit 18 and secures it to the film winding reel 23, to terminate the auto-advancement operation. The location data of the frames 20b to be reprinted is read out of the LSI card 35. Each frame 20b is positioned on the photometric station 70 in accordance with the location data, a count value of detecting the notches 20c from the notch sensor, and signals of detecting the spliced portions from the splice sensor. Then the frame 20b is subjected to photometry, according to which exposure correcting data is calculated. This data is written into the LSI card 35 together with the frame location data.

Figure 9:
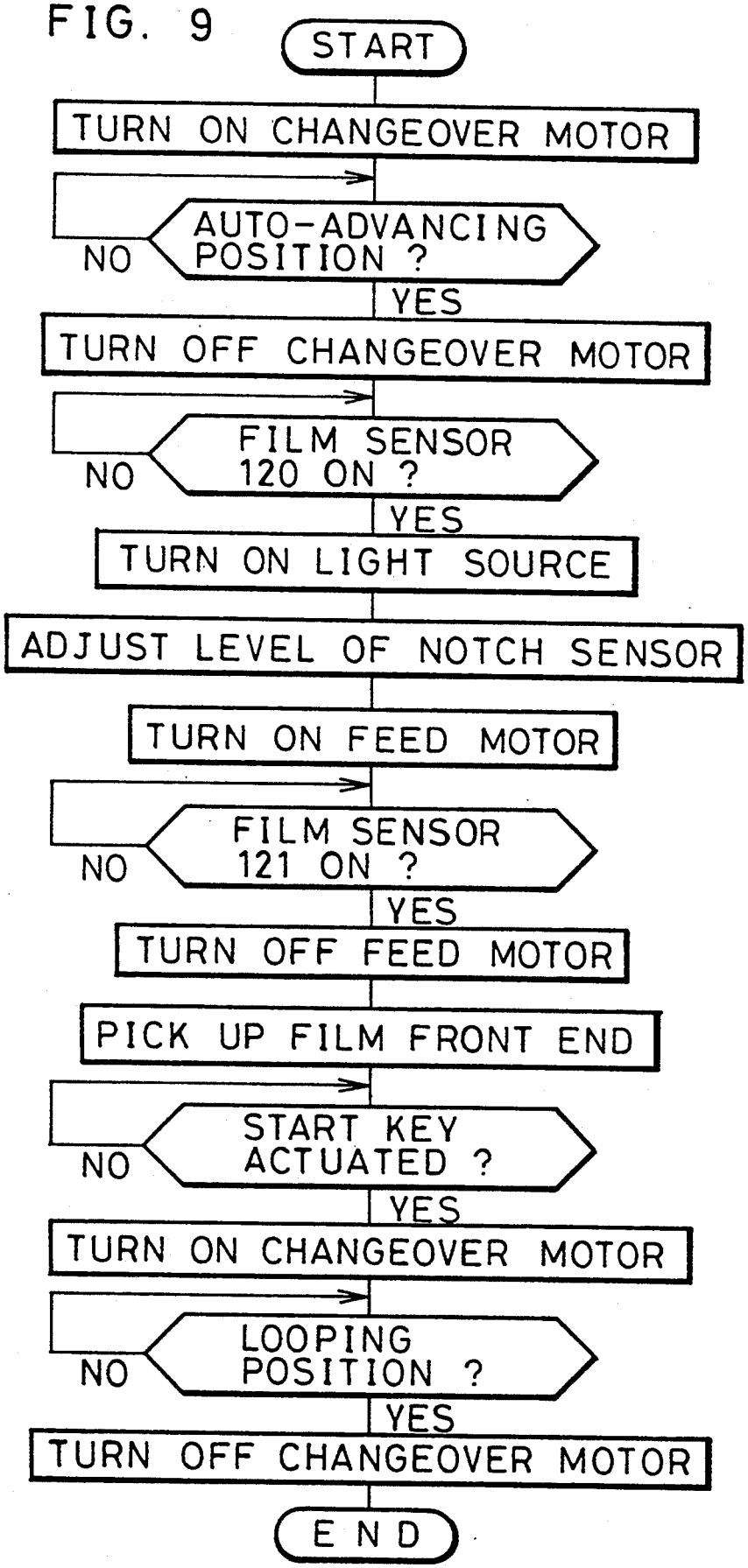
FIG. 9 is a flow chart, illustrating steps of the auto-advancing operation.
Figure 10:
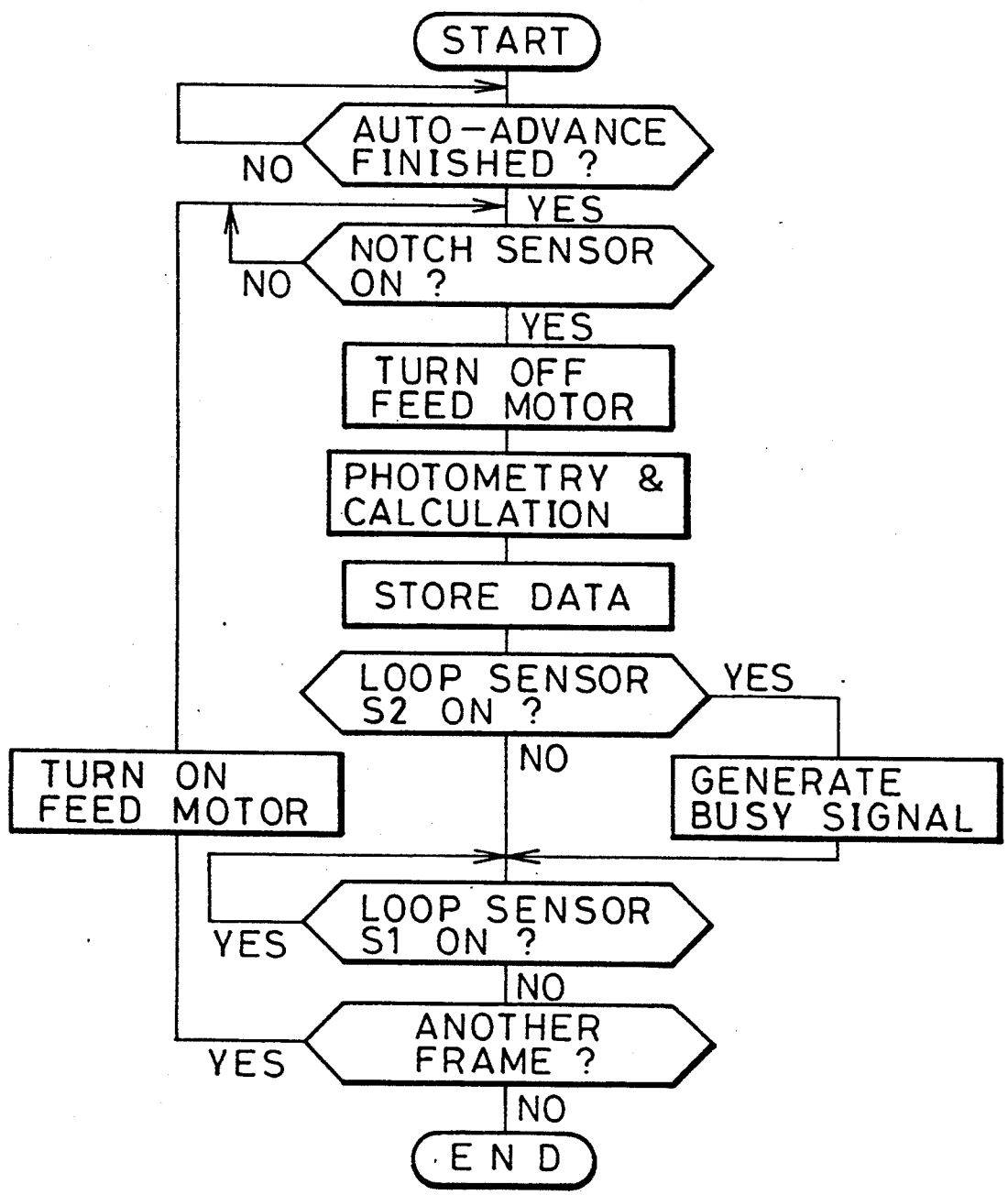
FIG. 10 is a flow chart illustrating steps of photometry and control of the notcher/puncher.

FIG. 9 illustrates a flow of steps of the auto-advancement operation in the controller 24. FIG. 10 illustrates a flow of photometry after the auto-advancement operation, and controls of the notcher/puncher 41 and the scanner 10 according to the loops.

The operation of the present embodiment is described with reference to FIGS. 9 and 10. After development, the film roll 131 is set in the notcher/puncher 41 as in FIG. 7. The front end of the leader sheet 20a on the film 20 is inserted in the film entrance 17 in the scanner 10. The notcher/puncher 41 forms notches 20c in one longitudinal edge of the film 20 and in locations of the frames 20b to be printed. If necessary, exposure correcting data is inputted. As soon as the front end of the leader sheet 20a on the film 20 having passed the notcher/puncher 41 is inserted in the film entrance 17, then the scanner 10 starts the auto-advancement operation as in FIG. 9, and initializes each relevant section of the scanner 10.

When the changeover motor 88 is driven, the changeover mechanism 86 comes to the auto-advancing position, which is confirmed by the loop checking sensor S3. In response to the detection at the loop checking sensor S3, the changeover motor 88 is turned off. I FIG. 2, the front end of the leader sheet 20a on the film 20 is inserted between the guide rollers 50, and is detected by the upstream film sensor 120, so as to turn on the light source 13 (see FIGS. 4 and 5). When the designated frame 20b is positioned on the photometric station 70, the illumination of the light source 13 becomes stable. The photometry at the image area sensor 108 can thus be performed with stabilized illumination. In response to turning on the upstream film sensor 120, the beam projector in the notch sensor 123 is actuated to project a beam, which is received by the beam receiver without obstruction. The controller 24 checks the beam as received, and initially adjusts the level of the sensitivity of the notch sensor 123 in an automatic fashion according to the checked result.

In the initial stage of the scanner 10, the advancing rollers 56 and 57 and the dancer rollers 60 and 64 are kept in the auto-advancing position by the changeover mechanism 86. In the auto-advancing position, the dancer rollers 60 and 64 are located on the feeding path 12 to stand by for drawing the film 20 to be looped. The advancing rollers 56 and 57 are to nip and convey the film 20.

When the upstream film sensor 120 is turned on, the feeding motor 72 is rotated. The front end of the leader sheet 20a is nipped by the feed rollers 56. The front end of the leader sheet 20a on the film 20 is guided by the guide plate 59 and another guide plate, not shown, is passed through the photometric station 70 and by the downstream film sensor 121, and is exited through the film exit 18. After the front end of the leader sheet 20a is passed by the downstream film sensor 121, the film 20 is fed at a predetermined amount. Then the film 20 is stopped. The front end of the leader sheet 20a projected out of the film exit 18 is picked up by an operator, and manually secured to the winding reel 23 in the film winding section 15. The start key among the operable keys 26 is operated. Responsively, the changeover motor 88 and the changeover mechanism 86 are operated to displace the associated arms to the looping position, which is confirmed by the loop checking sensors S1 and S2.

In course of feeding the film 20, the notch sensor 123 detects the notch 20c in the film 20. Upon this detection, the controller 24 starts measuring the amount of feeding of the film 20. Upon a movement of a predetermined length, the film 20 is stopped to set the designated frame 20b at the photometric station 70. The rotation of the mask turret 104 is controlled according to the frame size information from the notcher/puncher 41. One of the mask openings is set in correspondence with the frame size of the designated frame 20b set in the photometric station 70. The entire frame 20b is subjected to three-color separating photometry in the image area sensor 108 as in FIG. 5. Photometric values of the measured points are processed in the correction calculator 109 to calculate the exposure correcting data. The exposure correcting data is obtained in a form of a finite difference with reference to the LATD, and is written in the LSI card 35 together with the frame location data by the card reader/writer 110.

If the processing speed of the notcher/puncher 41 is significantly higher than that of the scanner 10, the difference in speed is absorbed by formation of the loop 63 at the dancer roller 60 in FIG. 4. In FIG. 6, when the looped amount at the dancer roller 60 falls below a predetermined amount, the loop checking sensor S1 is turned on. Then movement of the film 20 for photometry is stopped. When the looped amount at the dancer roller 60 exceeds another predetermined amount, the loop checking sensor S2 is turned on. Then the scanner 10 sends a busy signal to the notcher 41 to stop the supply device 41b from supplying the scanner 10 with the film 20.

During reprinting, the reprinting reel holder 40 is drawn out of the scanner body 11 as illustrated in FIG. 3. Responsively, the disk 45a is lifted to the level of the feeding path 12. The supply reel 48 with the reprinting film 47 wound thereabout is set on the reel shaft 45. Afterwards, the front end of the leader sheet on the film 47 is inserted in the film entrance 17. The auto-advancement operation is then started in similar fashion to the initial printing. The front end of the leader sheet is exited through the film exit 18. Manual operation fits the front end of the leader sheet on the film winding reel 23, to finish the auto-advancement operation. The reprinting frame 20b corresponding to the frame location data of the LSI card 35 is positioned in the photometric station 70, and is subjected to photometry. The exposure correcting data is written in the LSI card 35.

The film 20, 47 is removed from the film winding section 15 after photometry has been performed, and set into the auto-printer 160, as illustrated in FIG. 10, together with the LSI card 35. Instead of this, an extra reel may be used for setting the film 20 into the auto-printer 160. The empty reel may be set in the reprinting reel holder 40 in FIG. 3. The film after photometry may be rewound about the extra reel, and brought into the auto-printer.

In the above embodiment, the LSI card is used for storing the exposure correcting data. Instead, punch tape or a floppy disk may be used. In the embodiment above, the dancer rollers are used. Alternatively, another mechanism for loping the film may be used. The angle of displacement of the dancer arm 61 is checked to detect the looped amount. Instead, the position of the dancer roller 60 may be checked for detection. The scanner 10 is connected to the notcher/puncher 41, but instead can be connected to an auto-notcher.

Although the present invention has been fully described by way of the preferred embodiment thereof with reference to the accompanying drawings, various changes and modifications will be apparent to those having skill in this field without departing from the scope of the present invention, as defined by the appended claims.

What is claimed is:

1. A photo film inspecting system comprising a notcher for forming a notch in photo film in association with a frame to be printed and a film analyzer, supplied with said film by a supply device of said notcher, for measuring said frame on said film to calculate exposure correcting data, said film analyzer comprising:

a photometric device for subjecting said frame on said film to photometry;
   a feeding device for feeding said film, to cause said film to pass through said photometric device;
   a winding device for winding said film fed from said photometric device;
   a displacing device, mounted for movement away from a path of feeding said film, for displacing one portion of said film from said feeding path, said one portion of said film defining a loop;
   a checking device, disposed in association with said displacing device, for checking displacement of said film, and said checking device generating a signal representing whether or not said film displacement is equal to or smaller than a position representing a predetermined upper limit of said film displacement relative to said feeding path; and
   a controller, connected to said checking device, for generating a signal for stopping said supply device of said notcher if said film displacement is greater than said upper limit.

2. A film inspecting system as defined in claim 1, wherein:
   said checking device further generates a signal representing whether or not said film displacement is equal to or less than said lower limit of said film displacement relative to said feeding path; and
   said controller stops said photometry of said photometric device if said film displacement is less than said lower limit.

3. A film inspecting system as defined in claim 2, wherein said displacing device is disposed upstream from said photometric device.

4. A film inspecting system as defined in claim 3, wherein said film analyzer further comprises a notch detecting device for detecting said notch in said film and generating a notch signal in response thereto; and
   wherein said feeding device positions said film on said photometric device in accordance with said notch signal.

5. A film inspecting system as defined in claim 4, wherein said exposure correcting data indicates a finite difference with reference to a large-area transmittance density.

6. A film inspecting system as defined in claim 3, wherein said displacing device includes:
   a rotatable dancer roller disposed in said feeding path for contacting said film; and
   a shifting mechanism for shifting said dancer roller between a first orientation and a second orientation which is opposite to said first orientation with reference to said feeding path, said dancer roller forming said one portion of said film into a loop when shifted from first orientation to said second orientation.

7. A film inspecting system as defined in claim 6, wherein said checking device includes:
   a first position sensor fixedly disposed in a first position for checking a movement of said shifting mechanism, said first position detecting a first moving amount of said shifting mechanism, and said first moving amount corresponding with said lower limit, said first position sensor generating a signal representing whether or not said movement is equal to or greater than said first moving amount; and
   a second position sensor fixedly disposed in a second position for checking a movement of said shifting mechanism, said second position representing a second moving amount of said shifting mechanism, and said second moving amount corresponding with said upper limit, said second position sensor generating a signal representing whether or not said movement is equal to or smaller than said second moving amount; and said controller estimates said movement of said shifting mechanism in accordance with signals from said first and second position sensors, to evaluate said film displacement on a basis of said upper and lower limits.

8. A film inspecting system as defined in claim 6, wherein said film analyzer further comprises:
a first advancing device disposed beside said dancer roller for advancing said film;
a second advancing device, disposed downstream from said photometric device, for advancing said film;
an upstream detecting device, disposed at an entrance of said film, for detecting a leading end of said film; and
a downstream detecting device, disposed downstream from said second advancing device, for detecting said leading end of said film; and
said controller initially sets said dancer roller in said first orientation, causes said first and second advancing devices to rotate in response to a signal from said upstream detecting device, causes said first and second advancing devices to rotate as far as a predetermined amount in response to a signal from said downstream detecting device, then stops said first and second advancing devices, advances said film leading end to said winding device, subsequently releases said first advancing device to allow said first advancing device to rotate freely, and allows said dancer roller to move to said second orientation.

9. A film inspecting system as defined in claim 8, wherein said second advancing device is said feeding device.

10. A film inspecting system as defined in claim 9, wherein said film analyzer further comprises:
a feeding motor for driving said feeding device; and
a clutch device displaceable between connected and disconnected states, said clutch device in said connected state connecting said feeding motor to said first advancing device, said clutch device in said disconnected state disconnecting said feeding motor from said first advancing device, and said controller bringing said clutch device into said connected state for advancing said film front end to said winding device, to allow said first advancing device to rotate.

11. A film inspecting system as defined in claim 8, wherein said photometric device includes a light source, which is actuated when said upstream detecting device detects said film front end.

12. A film inspecting system as defined in claim 11, wherein said notch detecting device includes a photoreceptor, and said controller, in response to detection of said leading end at said upstream detecting device, initially adjusts a sensitivity level of said photoreceptor in accordance with a signal therefrom while receiving light without interception of a light path of said photoreceptor.

13. A film inspecting system as defined in claim 3, wherein said film analyzer further comprises a rotatable shaft device, disposed upstream from said feeding path of said film, for mounting a supply reel thereon with photo film wound to be supplied.

14. A film inspecting system as defined in claim 13, wherein said film analyzer further comprises a recess formed in a body in association with said shaft device, said shaft device being displaced between a contained position of being contained in said recess and a drawn position wherein it extends out of said recess, and said supply reel mounted on said shaft device while in said drawn position.

15. A film inspecting system as defined in claim 14, wherein said film analyzer further comprises a sliding device associated with said shaft device for sliding said shaft device in an axial direction thereof, said shaft device being slid to said feeding path when in said drawn position.

16. A photo film inspecting method of measuring a frame on photo film consecutively supplied from a notcher for forming a notch in said photo film in association with said frame to be printed, said film inspecting method comprising steps of:
subjecting said frame on said film to photometry with a photometric device;
feeding said film, to cause said film to pass said photometric device;
winding said film fed from said photometric device;
displacing one portion of said film from said feeding path, to form a loop from said one portion of said film;
checking displacement of said film in comparison with a predetermined upper limit; and
stopping said notcher from supplying said film, if said film displacement is greater than said upper limit.

17. A film inspecting method as defined in claim 16, comprising further steps of:
checking said displacement of said film in comparison with a predetermined lower limit; and
stopping said photometry of said photometric device if said film displacement is smaller than said lower limit.

18. A film inspecting method as defined in claim 17, comprising further steps of:
causing a displacing device to contact said one portion of said film for displacement thereof;
checking a movement of said displacing device with reference to a first position, said first position representing a first moving amount of said displacing device, and said first moving amount associated with said lower limit;
determining whether or not said movement is equal to or greater than said first moving amount;
checking said movement of said displacing device with reference to a second position, said second position representing a second moving amount of said displacing device, and said second moving amount associated with said upper limit; and
determining whether or not said movement is equal to or smaller than said second moving amount.

19. A film analyzer, consecutively supplied with photo film by a notcher forming a notch in photo film, for measuring a frame on said film, said film analyzer comprising:
a photometric device for subjecting said frame on said film to photometry;
a feeding device for feeding said film, to cause said film to pass said photometric device;

a winding device for winding said film fed from said photometric device;

a displacing device, disposed movably away from a path of feeding said film, for displacing one portion of said film from said feeding path, a loop formed from said one portion of said film;

a checking device, disposed in association with said displacing device, for checking displacement of said film, said checking device having positions representing predetermined upper and lower limits of said film displacement relative to said feeding path, and said checking device generating a signal representing that said film displacement is greater than said upper limit, is between said upper and lower limits, or is smaller than said lower limit; and a controller, connected to said checking device, for stopping said notcher from supplying said film if said film displacement is greater than said upper limit, and for stopping said photometry of said photometric device if said film displacement is smaller than said lower limit.

* * * * *